Aug. 10, 1965
E. B. HARRELL ETAL
3,199,199
LIQUID LEVEL INDICATOR
Filed Dec. 20, 1961
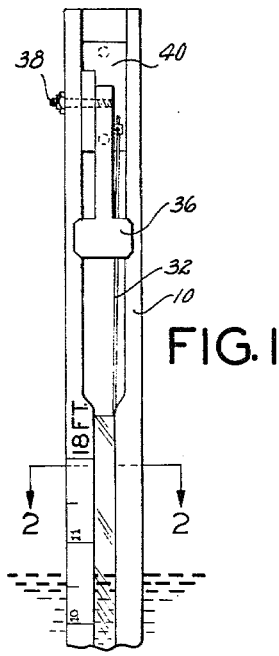
FIG. 1
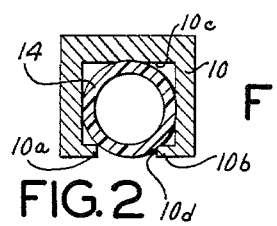
FIG. 2
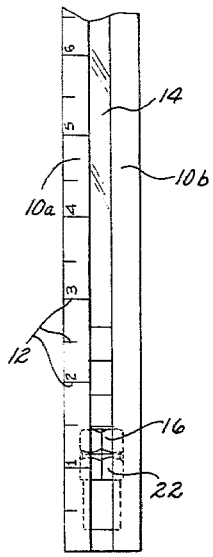
FIG. 3
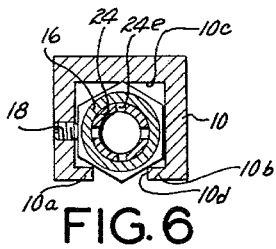
FIG. 6
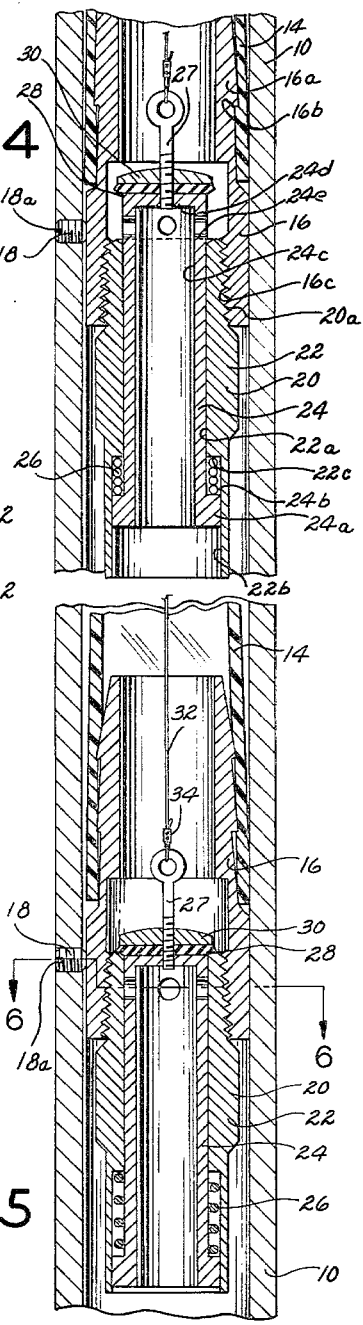
FIG. 4
FIG. 5
INVENTOR.
EDWARD B. HARRELL
IRVING A. GUTHRIE
BY FULIWIDER, MATTINGLY
& HUNTLEY
ATTORNEYS

United States Patent Office 3,199,199
Patented Aug. 10, 1965

---

3,199,199
LIQUID LEVEL INDICATOR
Edward B. Harrell, 6509 S. Broadway, Whittier, Calif., and Irving A. Guthrie, La Mirada, Calif.; said Guthrie assignor to said Harrell
Filed Dec. 20, 1961, Ser. No. 160,847
1 Claim. (Cl. 33—126.4)

The present invention relates generally to liquid level indicators, but more particularly to indicating devices for use with relatively inaccessible storage tanks.

In certain industries, as for instance the petroleum industry, it is necessary to frequently determine the amount of liquid such as gasoline, oil or other petroleum product within storage tanks provided for that purpose. Frequently, such tanks are positioned in a somewhat inaccessible location as for instance in a recessed position below the surface of the ground. Due to this arrangement, level indicating devices such as transparent tubes and the like cannot be used to advantage for indicating the level of the liquids within such tanks.

In view of the foregoing, there has resulted the current practice of using a "dip stick" which can be inserted into the tank through a relatively small opening therein, and which subsequently can be withdrawn for indicating the height of the liquid within the tank. However, such devices have not proved completely satisfactory particularly where a relatively accurate indication is required. That is, since most petroleum products have a relatively high evaporation rate, it has been discovered that during the time necessary for withdrawing the "dip stick" from the tank, the level indication on such stick can vary as much as several inches. Also, such "dip sticks" frequently become dirty and encrusted with foreign material which prevents the liquid from properly adhering to the stick for giving the proper indication. Frequently, such foreign material obliterates the measurement indicia on the stick to render it even more difficult to provide an accurate level indication.

It is an object of the present invention to provide a liquid level indicator which is substantially unaffected by the high evaporation rate of liquid materials.

Another object of this invention is to provide a liquid level indicator which is substantially impervious to petroleum products and many other chemicals.

Another object of this invention is to provide a liquid level indicator as characterized above which can be easily and accurately read.

Another object of this invention is to provide an indicator as characterized above which is operable to provide a column of liquid equal to the depth of the liquid within the tank which can be removed and inspected or measured.

Another object of this invention is to provide a liquid level indicator which is simple and inexpensive to manufacture and which is rugged and dependable in operation.

The novel features which we consider characteristic of our invention are set forth with particularity in the appended claims. The device itself, however, both as to its organization and mode of operation, together with additional objects and advantages thereof, will best be understood from the following description of specific embodiments when read in connection with the accompanying drawings, in which:

FIGURE 1 is a fragmentary elevational view of an indicator according to the present invention;
FIGURE 2 is a sectional view taken substantially along line 2—2 of FIGURE 1;
FIGURE 3 is a fragmentary sectional view of the upper portion of the indicator of FIGURE 1;
FIGURE 4 is a fragmentary sectional view of the lower portion of such indicator;
FIGURE 5 is a fragmentary sectional view similar to FIGURE 4 showing the valve in closed position; and
FIGURE 6 is a transverse sectional view taken substantially along line 6—6 of FIGURE 5.

Like reference characters indicate corresponding parts throughout the several views of the drawings.

Referring to FIGURE 1 of the drawings, there is shown therein a preferred form of the present invention. It comprises an elongated frame 10 which is formed with a substantially U-shape as shown most clearly in FIGURES 2 and 6, and is constructed of any appropriate material which is light in weight and which is impervious to the chemicals to be measured. Such U-shaped frame may be provided with a pair of opposed flanges 10a and 10b providing a central continuous cavity 10c and an elongated opening or slot 10d.

Frame 10 may be of any desired length, within the scope of the present invention, in accordance with the height or depth of the storage tanks to be measured. Along one of the flanges, as for instance along flange 10a of the embodiment shown in FIGURE 1, there is provided suitable linear measurement indicia 12 which begin at the lower end of frame 10 and increase toward the upper end thereof. In this regard, and as will hereinafter become more apparent, such indicia on flange 10a need not commence with a zero graduation at the bottom of the frame, but rather it is merely necessary that after the entire indicating device is assembled, as will hereinafter be described in detail, the distance from the lowermost point of the indicator to the various positions on flange 10a will be indicated by accurate linear measurement indicia. That is, if the bottom of frame 10 is not the lowermost point of the completed indicating device, the indicia on flange 10a would not begin with the zero graduation. Such flexibility in practicing the present invention is contemplated within the scope of the present invention.

Within the elongated central cavity 10c of frame 10 is firmly positioned a transparent tubular member 14 formed of plastic or any other suitable material through which a liquid level can be viewed, such materials also being impervious to the chemicals to be contacted thereby. Tubular member 14 extends for substantially the entire length of the frame 10.

It is desirable that tubular member 14 fit snugly within the U-shaped configuration of frame 10 such that the forward portion thereof is adjacent the opening 10d between the flanges 10a and 10b of such frame. In this regard, it may be desirable to employ spacing means of any desired form between the tubular member 14 and the back of frame 10 to firmly position such members. Due to this arrangement, the tubular member 14 will be immediately adjacent the linear measurement graduations 12 to greatly facilitate accurate reading of the liquid level within such tubular member.

As shown most clearly in FIGURES 4 and 5 of the drawings, the lower portion of tubular member 14 is provided with an adapter 16 having a reduced upper end portion 16a provided with annular teeth or ridges as at 16b for insuring fluid tight engagement between adapter 16 and the tubular member 14. Also, the annular ridges 16b assist in preventing separation of adapter 16 from member 14. In this regard, there is provided a set screw 18 threadedly positioned within a suitable threaded opening in the side wall of frame 10 to afford further assistance in maintaining adapter 16 in assembled relation within the lower end of tubular member 14. Set screw 18 is provided with a screw driver kerf 18a to facilitate adjustment of such screw for firm engagement with adapter 16.

The lower end portion of adapter 16 is formed with internal fastening threads as at 16c which may be tapered, if desired, as will hereinafter become more apparent. For engagement with such threads in the lower end of adapter 16 there is provided a valve 20 having threads 20a for mating engagement with threads 16c.

Valve 20 comprises a stationary sleeve 22 formed with a through opening 22a which is enlarged at its lower end as at 22b to provide an annular shoulder 22c. A cylindrical valve member 24 is provided for reciprocating sliding movement within opening 22a of sleeve 22. The lower end portion of valve member 24 is enlarged to provide an annular flange 24a having an annular shoulder 24b. A helical compression spring 26 is interposed between shoulder 22c of sleeve 22 and shoulder 24b of valve member 24.

Valve member 24 is formed with a central opening 24c which terminates at an upper end wall 24d. The upper end portion of valve member 24 is provided with a plurality of radial openings 24e near end wall 24d and which communicate with the longitudinal opening 24c.

A fastening member in the form of an eye bolt 27 is threadedly fastened to the end wall 24c of valve member 24, there being a resilient valve member 28 and a retainer 30 therefor held against said end wall by such eye bolt. As will be noted in FIGURES 4 and 5, valve member 28 is of such size as to overhand the end wall of valve member 24 to provide an annular peripheral portion for sealing engagement with the upper end of sleeve 22 as will hereinafter be described in detail.

Attached to eye bolt 27 is a force transmitting connector in the form of a cord 32 which may be formed of nylon, and extends through the hollow interior of adapter 16 and tubular member 14. The lower end of cord 32 is fastened by means such as metal fastener 34 to eye bolt 26.

The upper end of such cord is connected to a lever 36 which is pivotally mounted on a pin 38. Pin 38 is mounted relative to frame 10 by a bracket 40 which is firmly attached ot the back of frame 10 by screws 42. Cord 32 is attached to manually operable lever 36 at a point spaced from the axis of rotation of such lever on pin 38.

The liquid level indicating device shown in the drawings operates substantially as follows.

The entire device is inserted in an upright position into the tank to be measured, the lower end of the device engaging or resting against the bottom of the tank. While thus positioned, the linear measurement indicia 12 on frame 10 accurately indicate the distance between the level of the liquid and the bottom of the tank. As above explained, the lowermost portion of the indicating device need not necessarily be the lower end of frame 10 but rather may be the lower end portion of valve 20. In any event, however, the indicia 12 will be arranged such as to indicate the true depth of the liquid when the lowermost portion of the device is resting against the bottom of the tank. As will be readily apparent to those persons skilled in the art, such indicating device should be in a substantially vertical position to provide the most accurate reading as will hereinafter become more apparent.

When the indicating device is so positioned, the manually operable lever 36, which is positioned outside the tank, is pivoted in a clockwise direction as shown in FIGURE 3, to its uppermost position. Such movement of lever 36 causes cord 32 to lift valve member 28 from flow preventing engagement with the upper end of sleeve 22, and ultimately for the radial openings 24e of cylindrical member 24 to be exposed within adapter 16 as shown in FIGURE 4. Thus, the valve 20 is open, and it may be held in such position by any suitable means as for instance the over center action of lever 36.

While in this position, the liquid within the tank will seek its own level within transparent tubular member 14. This will be readily accomplished due to the fact that the upper end of tubular member 14 is open.

After a relatively short period of time, the level of liquid within tubular member 14 will coincide with the level of the liquid within the tank being measured. The manually operable lever 36 is then returned to its lowermost position so as to permit compression spring 26 to return level member 24 to its retracted position. When this occurs, fluid flow will be prevented through valve 20 due to the retraction of the radial openings 24e to within sleeve 22, and due to sealing engagement of the peripheral portion of valve member 28 with the upper end of said sleeve.

The entire indicating device can then be removed from the tank and the height of the column of liquid within tubular member 14 noted according to the indicia 12 on flange 10a of frame 10. In this manner, an accurate indication is afforded of the level of fluid within the tank measured.

It is thus seen that the present invention provides accurate liquid level indicating means which is substantially unaffected by the relatively high evaporation rate of many petroleum and chemical products. Also, such device is substantially impervious to the harsh chemical properties of such liquids due to the materials of which such device is constructed.

Although we have shown and described certain specific embodiments of our invention we are fully aware that many modifications thereof are possible. Our invention, therefore, is not to be restricted except insofar as is necessitated by the prior art and by the spirit of the appended claims.

We claim:

A liquid level indicator comprising:
(a) a substantially U-shaped elongated frame forming a channel along the length thereof, said frame being formed with a pair of substantially parallel side portions, a bight portion and inwardly directed flanges on said side portions;
(b) an elongated, transparent plastic tubular member having upper and lower ends mounted in said frame, said frame encompassing a substantial portion of the circumference of said tubular member throughout its length;
(c) indicia on one of said flanges adjacent and substantially coextensive with said tubular member;
(d) an adapter having a fluid passage therethrough and having annular ridges thereon, said adapter fixedly inserted in said lower end of said tubular member for insuring a fluid-tight engagement between said adapter and said tubular member;
(e) a valve body fixedly mounted in said adapter, said valve body including a fluid passage open at its lower extremity and in communication at its upper extremity with the interior of said fluid passage in said adapter, said valve body further having an annular valve seat at said upper extremity;
(f) a valve having radially extending valve openings mounted in said valve body;
(g) a resilient annular seal on said valve and cooperating with said valve seat, said valve being longitudinally slidable in said valve body from an open position, whereby said valve openings extend above said valve seat and fluid is permitted to pass into the lower extremity of said fluid passage in said valve body through said openings past said valve seat, and into said tubular member, to a closed position, wherein said openings are in said valve body and said seal is resiliently engaged between said valve and said valve seat to prevent fluid flow therepast;

(h) bias means interposed between said valve body and said valve and normally biasing said valve to said closed position;

(i) and means mounted at the upper end of said frame and connected to said valve through the interior of said tubular member to move said valve to said open position.

References Cited by the Examiner

UNITED STATES PATENTS 2,544,262   3/51   Hall _____ 33—126.4
2,876,548   3/59   Banker _____ 33—126.4

FOREIGN PATENTS 4,779     5/02   Denmark.
643,737   5/28   France.

ISAAC LISANN, *Primary Examiner.*
ROBERT EVANS, *Examiner.*